United States Patent [19]
Laughlin

[11] Patent Number: 5,176,030
[45] Date of Patent: Jan. 5, 1993

[54] LOW FREQUENCY ANGULAR VELOCITY SENSOR

[75] Inventor: Darren R. Laughlin, Albuquerque, N. Mex.

[73] Assignee: Applied Technology Associates, Inc., Albuquerque, N. Mex.

[21] Appl. No.: 619,312

[22] Filed: Nov. 28, 1990

[51] Int. Cl.⁵ .................................................. G01P 9/00
[52] U.S. Cl. .................................. 73/505; 73/516 LM
[58] Field of Search ............. 73/505, 516 LM, 517 A, 73/652, 654; 310/11

[56] References Cited

U.S. PATENT DOCUMENTS

| | | |
|---|---|---|
| 3,083,578 | 4/1963 | Rosato et al. |
| 3,176,520 | 4/1965 | Aske ............................ 73/516 LM |
| 3,238,787 | 3/1966 | Riordan ........................ 73/516 LM |
| 3,618,399 | 11/1971 | Aske ..................................... 73/505 |
| 3,839,904 | 10/1974 | Stripling et al. |
| 4,213,343 | 7/1980 | Hoffman. |
| 4,254,659 | 3/1981 | Benedetto et al. |
| 4,359,685 | 11/1982 | Eguchi et al. |
| 4,490,674 | 12/1984 | Ito. |
| 4,583,207 | 4/1986 | Greer, Jr. |
| 4,764,908 | 8/1988 | Greer, Jr. |

FOREIGN PATENT DOCUMENTS

1029086 7/1983 U.S.S.R. ............................ 73/517 A

Primary Examiner—John E. Chapman
Attorney, Agent, or Firm—Pollock, Vande Sande & Priddy

[57] ABSTRACT

A magnetohydrodynmic angular rate sensor is described. A housing supports first and second coaxial proof masses in respective annular channels, permitting relative motion between the axis of the proof masses and the housings. First and second magnets associated with each annular channel result in an electric potential being generated across each channel proportional to the relative circumferential velocity between the proof masses and the housing. The annular channels are connected together to form a continuous pumped fluid circuit which introduces a radial flow velocity in each channel. At low rotational frequencies, a circumferential velocity component is induced in the proof masses due to Coriolis acceleration which results in a measurable electrical voltage across the annular channels. The low frequency response of the sensor is therefor extended to lower frequencies.

9 Claims, 6 Drawing Sheets

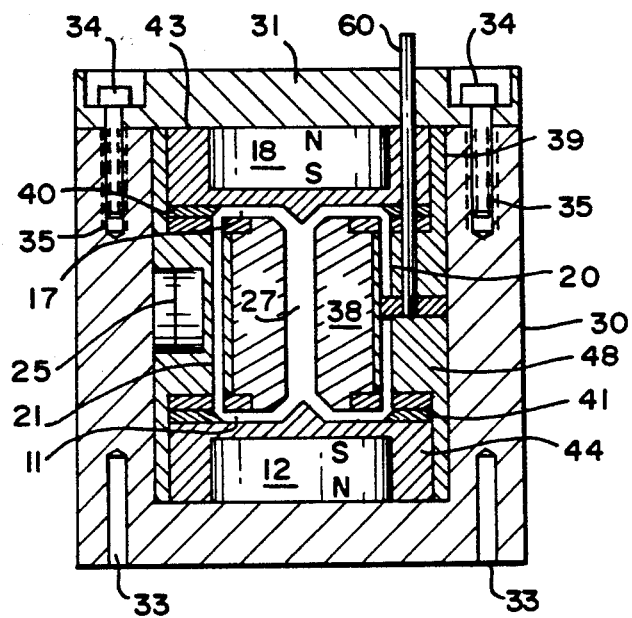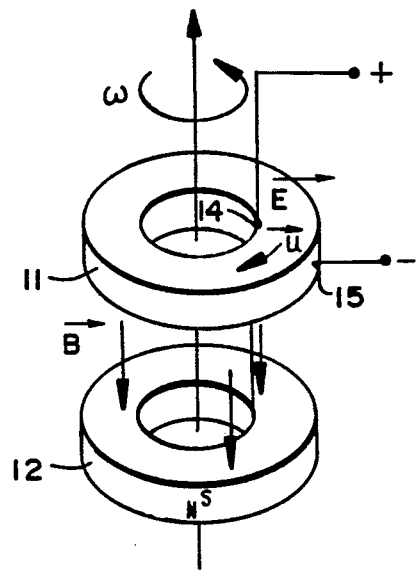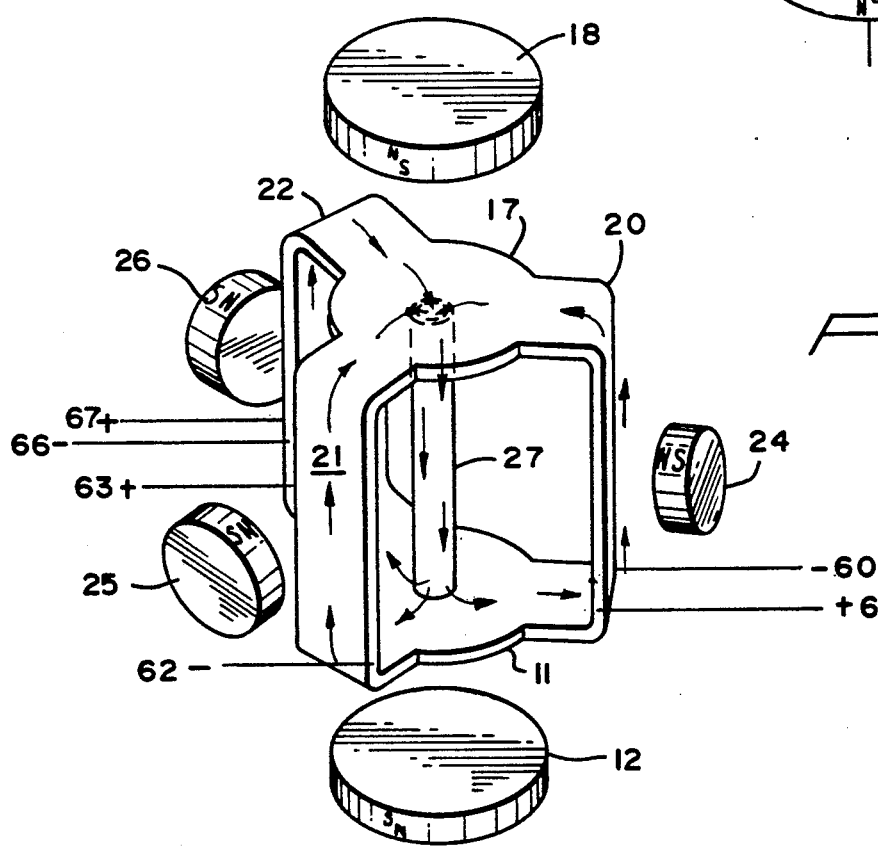

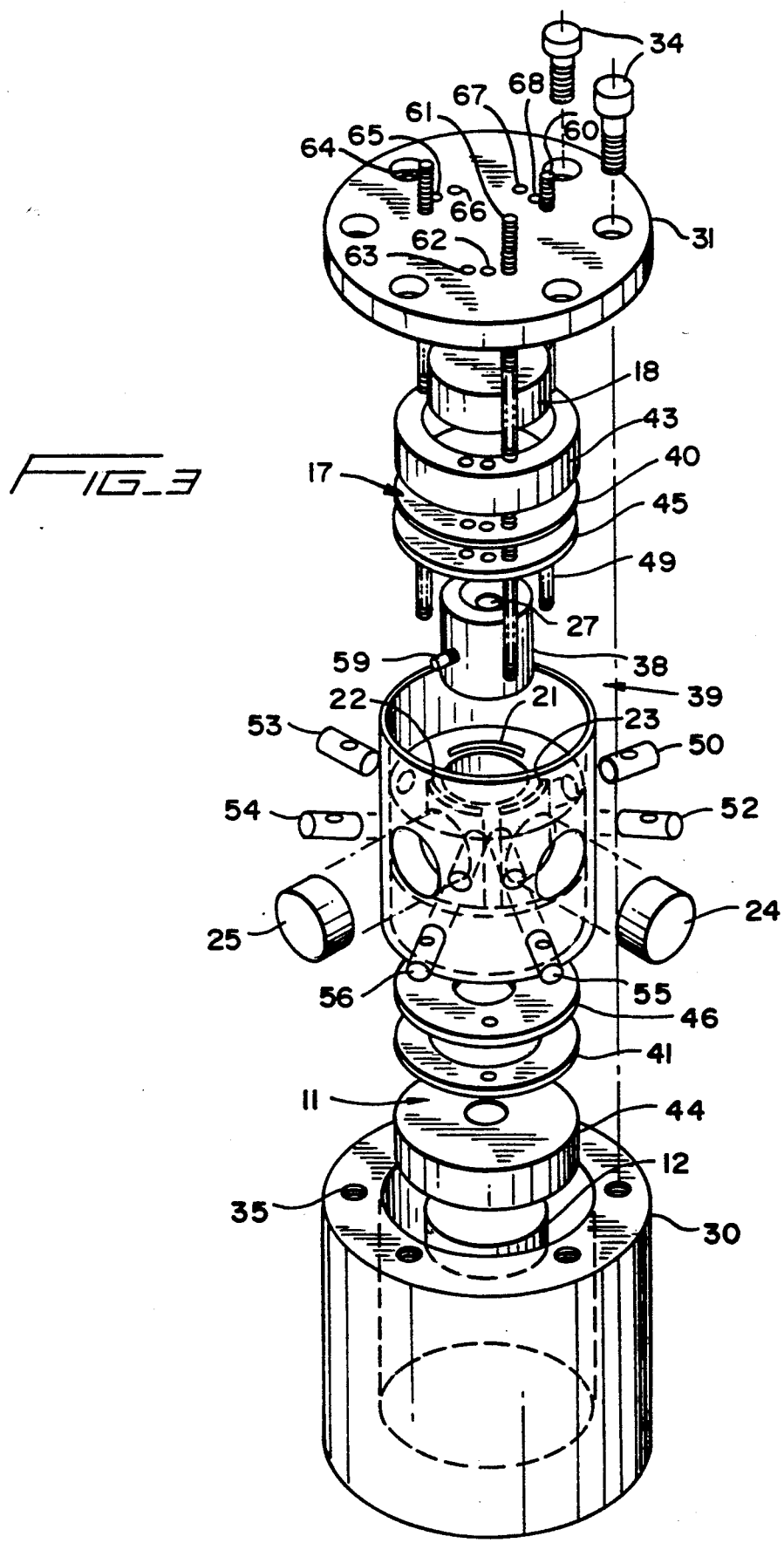

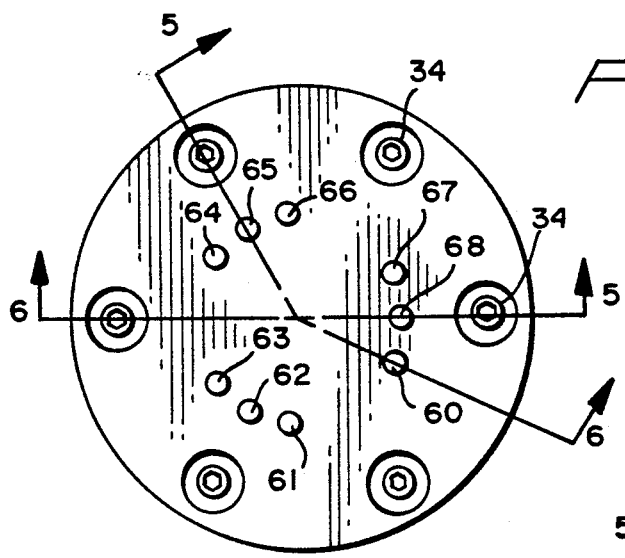
FIG_4
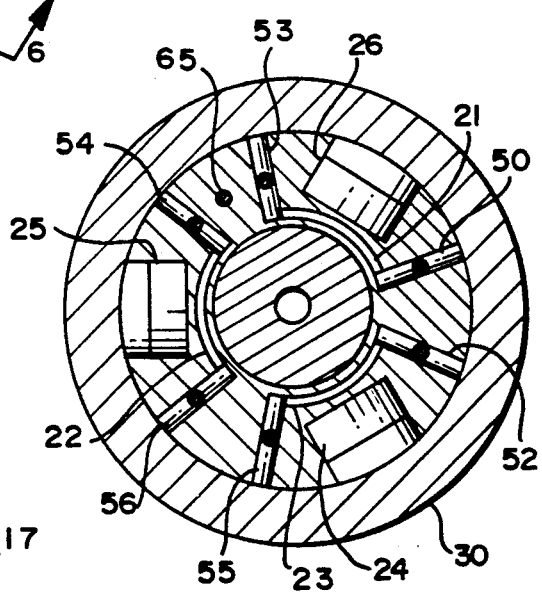
FIG_7
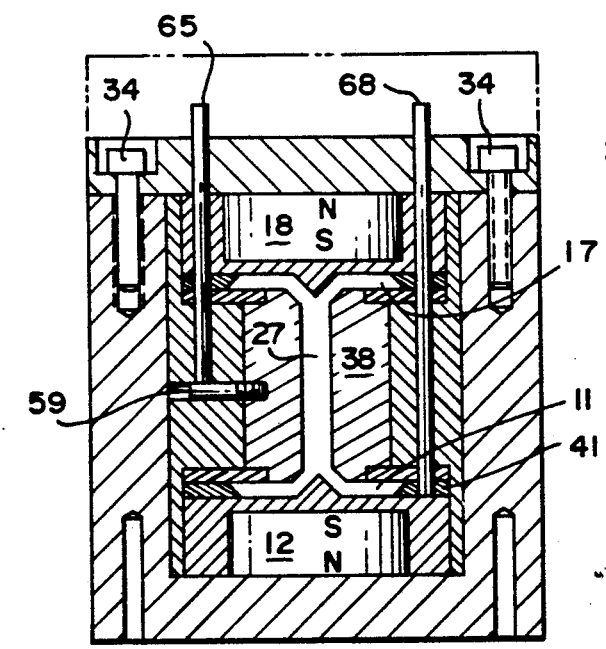
FIG_5

LOW FREQUENCY ANGULAR VELOCITY SENSOR

RELATED APPLICATIONS

This application is related to copending U.S. patent application Ser. No. 07/426,254, filed Oct. 25, 1989, now U.S. Pat. No. 5,067,351.

BACKGROUND OF THE INVENTION

The present invention relates to the field of angular velocity measurement sensors. Specifically, a magnetohydrodynamic angular rate sensor is described for sensing low frequency angular velocities.

As described in U.S. Pat. No. 4,718,276, it is possible to measure angular velocity about an axis of rotation using MHD angular rate sensors. These prior art sensors employ an annulus of liquid mercury which functions as a passive inertial proof mass. As the sensor having the annulus of liquid mercury rotates about a measurement axis, the relative motion between the liquid mercury proof mass and the channel within which the liquid mercury is maintained results in a voltage potential difference across the channel. A permanent magnet supplies the requisite magnetic field to generate the electric voltage orthogonally oriented to the magnetic flux across the mercury channel.

When using the sensors in applications which require the measurement of low frequency angular motion, the sensors have a limited sensitivity at a frequency of less than 10 Hz. Thus, the frequency response falls off rapidly below 10 Hz, providing uncertainty for angular velocity measurements below 10 Hz. It is with this limitation that the present invention finds its particular utility.

In applications in which it is desired to measure such low frequency angular velocity, angular rate gyroscopes are frequently used. The gyroscopes have a limited life due to mechanical wear and fatigue of the complicated movable component systems.

The present invention is therefore provided to measure the low frequency angular measurements heretofore unattainable by the magnetohydrodynamic angular rate sensors of the prior art, and provide sensors which are less susceptible to mechanical wear and fatigue.

SUMMARY OF THE INVENTION

It is a primary object of this invention to provide a sensor for measuring low frequency angular rotation velocity.

It is a more specific object of this invention to provide a sensor which will have an increased measurement bandwidth.

It is still a further object of this invention to provide for a sensor which measures Coriolis acceleration induced circumferential velocity components at low angular rates.

These and other objects of the invention are provided for by a sensor having two liquid inertial proof masses connected together by a fluid circuit. The two annular proof masses of an electrically conductive liquid such as mercury are exposed to a magnetic field such that each generates an electric potential across the respective annular channel containing the liquid mercury during rotation of the sensor. The two mercury channels are connected together by a magnetohydrodynamic pump and return tube at the center of each channel so that mercury is recirculated between the channels in a continuous fluid circuit.

Pumping the liquid mercury between the two annular channels introduces a Coriolis acceleration component to the mercury flowing in each channel as it radially enters the channels. The Coriolis component at low angular rotation rates induces a circumferential velocity component which is sensed as a voltage at the electrodes of each channel. At higher frequency rotational rates, conventional sensing of the circumferential velocity components occurs as the Coriolis induced component decreases.

The sensing of the Coriolis induced circumferential velocity component due to the radial flow of liquid mercury into the first annular channel, and out of the second annular channel, is blended together with the sensing of higher frequency velocity components to provide for both low frequency, i.e., below 10 Hz., angular rate sensing, as well as high frequency, i.e., above 10 Hz., angular frequency rate sensing about the sensor's axis.

In a preferred embodiment of the invention, the two annular channels each supporting a mercury proof mass are connected together via three vertically extending channels which are pumped by magnetohydrodynamic pumping means. The channels are connected together by a return tube such that mercury flowing into the uppermost channel returns through the return tube to the lowermost channel where it may again be pumped to form a radial flow component for the liquid inertial proof masses of each of the annular channels. The annular channels are parallel to each other and spaced apart having axes which are coaxial, forming a sensitive axis for the sensor. Each channel has its own permanent magnet associated therewith for generating the required flux needed to induce a voltage across the channel to sense movement of the inertial proof mass within the channel.

DESCRIPTION OF THE FIGURES

FIG. 1 illustrates the principle of angular motion detection by sensing the relative motion between an inertial proof mass and a housing by measuring the electric field induced from magnetohydrodynamic effects.

FIG. 2 shows the arrangement of a preferred embodiment of the invention wherein two inertial proof mass magnetohydrodynamic detectors are connected together by pumping chambers 20, 21 and 22, and a return tube 27.

FIG. 3 is an exploded view of a preferred embodiment of the invention.

FIG. 4 is a top view of the preferred embodiment of the invention showing the electrical connections to the sensor of FIG. 3.

FIG. 5 is a section view A-A of the sensor in accordance with the preferred embodiment of the invention.

FIG. 6 is a section view B-B of the same preferred embodiment of the invention.

FIG. 7 is yet another section view of the preferred embodiment of the invention illustrating the arrangement for the pumping channels.

DESCRIPTION OF THE PREFERRED EMBODIMENT

Figure 8:
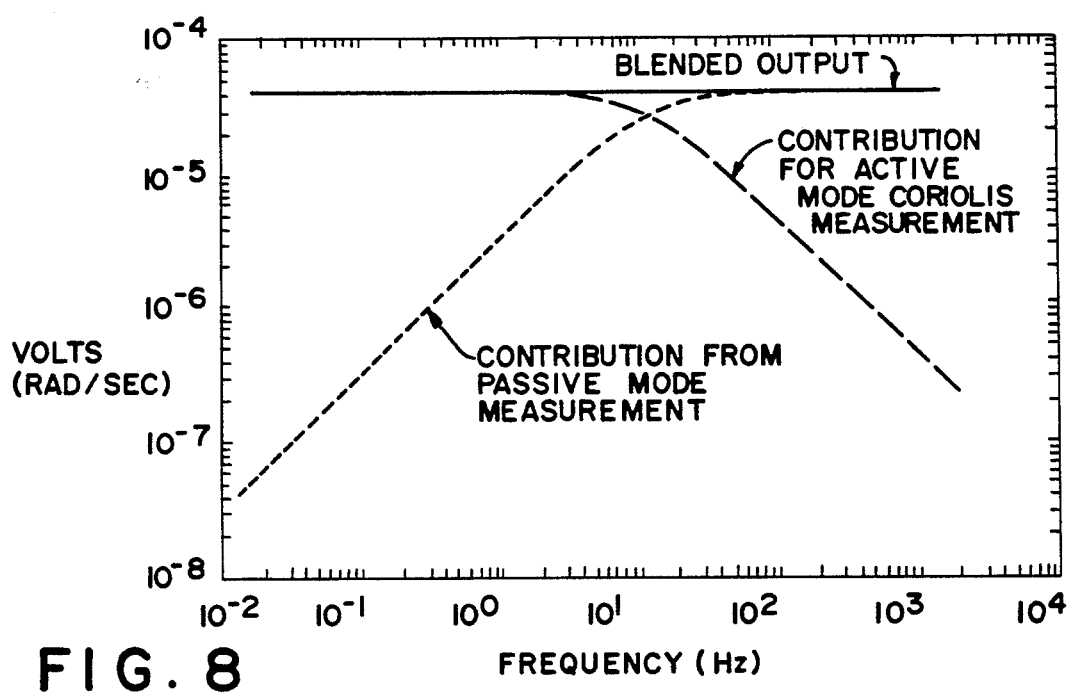
FIG. 8 illustrates the amplitude response of the sensor over an extended useful bandwidth.

Turning now to FIG. 1, there is shown the principle for angular velocity sensing using magnetohydrodynamic techniques. An annular channel 11 supports a liquid inertial mass which is preferably mercury. The liquid inertial mass tends to remain stationary while the annular channel rotates about its axis at an angular velocity of $\omega$. The permanent magnet 12, shown as a disc coaxially located with respect to the annular channel 11, results in generation of an electric potential E across the annular channel between contacts 14, 15. In accordance with the principles of magnetohydrodynamic voltage generation, the electric potential is proportional to the following:

$$\frac{E(s)}{\omega(s)} = \frac{2 B Wr}{s + \frac{\nu}{h^2}(1 + M^2)}$$

where
B is the applied magnetic field flux;
$\nu$ is the mercury kinematic viscosity;
h is the channel height;
M is the Hartmann number;
W is the channel width;
r is the RMS channel radius; and
s is the Laplace operator.

The practical limitations of sensing the angular velocity include a limitation on the bandwidth of angular velocity measurements. Above 10 Hz., the velocity measurements tend to be relatively stable with increasing frequency.

In order to improve the low frequency response for the MHD inertial proof mass sensor shown in FIG. 1, an implementation schematically represented in FIG. 2 is proposed.

FIG. 2 illustrates two annular channels 11 and 17, each of which contain a liquid proof mass which is preferably mercury. Shown connected to each of the annular channels 11 and 17 are three vertical fluid channels 20, 21 and 22, as well as a return conduit 27. By pumping the liquid proof mass through each of the fluid channels 20, 21 and 22, it is possible to introduce a radial velocity component within the annular channel. A pair of magnets 12 and 18 provide the magnetic flux for each of the annular channels 11 and 17. Not shown are a pair of electrodes at the periphery of each annular channel, as well as a common central electrode at the center of each channel coextensive with conduit 27.

As will become apparent when describing a specific implementation of the sensor, the sensed electric potential E is proportional to two components as follows:

$$\frac{E(s)}{\omega(s)} = \frac{2 B Wrs + 4 B WU}{s + \frac{\nu}{h^2}(1 + M^2)}$$

where $\nu$, B, h and M being previously defined and U is the average radial velocity of the mercury entering and leaving the channels 11, 17.

The second of these components represents a Coriolis acceleration induced circumferential velocity, which, at low frequencies, is the dominant component of the angular velocity for the sensor. The result of introducing a radial velocity component into the flow of the inertial proof mass, produces a Coriolis acceleration induced angular velocity component expressed as follows:

$$\frac{E(s)}{\omega(s)} = \frac{4 B WU}{s + \frac{\nu}{h^2}(1 + M^2)}$$

This Coriolis acceleration induced component is proportional to the angular velocity $\omega(s)$ at lower frequencies, as the angular frequency moves toward zero.

If an angular rate input $\omega(s)$ is applied about the sensitive axis of the sensor, the radially flowing mercury in the upper 17 and lower 11 sense channels will be subjected to a Coriolis acceleration proportional to the radial velocity U and angular rate $\omega$. The Coriolis acceleration is defined as the component of acceleration which is the result of a body in motion with velocity U moving in a rotating frame with an angular rate of $\omega$. $a_{coriolis} = 2\omega U$, where $\omega$ is the input angular rate, and U is the velocity of the body in motion (mercury) with respect to the input angular rate applied to the case. When the sensor is rotated about its sensitive axis (coincident with the cylindrical axis) at a constant rate, the radial mercury velocity vector is orthogonal to the input angular rate $\omega$, resulting in a Coriolis acceleration component to be applied to the mercury in the circumferential direction. This will cause the mercury to move in the counterclockwise direction in the upper channel, and conversely, clockwise in the lower channel, but with equal magnitude assuming equal dimensions and magnetic field strengths of each of the sense magnets. This equal and opposite mercury flow velocity is measured as a potential between the outside and inside electrodes of each of the upper 17 and lower 11 sense channels. If the input rate is constant, the circumferential mercury velocity will reach a steady state value. The output voltage is proportional to the angular rate input about the sensitive axis, and also the flow velocity of the mercury.

The radial velocity component results by pumping radially into each of the fluid channels 20, 21 and 22 the inertial proof mass such that upon entering channel 17, the radial flow is sensed at the upper channel as a circumferential velocity component induced by Coriolis acceleration, and upon leaving through conduit 27, the radial flow is also sensed in the lower channel 11 as an induced circumferential velocity due to the Coriolis acceleration. As the rotational frequency increases, the Coriolis induced circumferential component becomes less with respect to the total circumferential velocity component for the inertial proof mass of each of the channels 11 and 17. The resulting output for a constant amplitude angular rate from zero frequency to approximately 1,000 Hz. represents a relatively constant sensed output voltage. As the frequency increases, the detection of low frequency Coriolis acceleration decreases, while the conventional proof mass angular velocity component increases.

Figure 9:
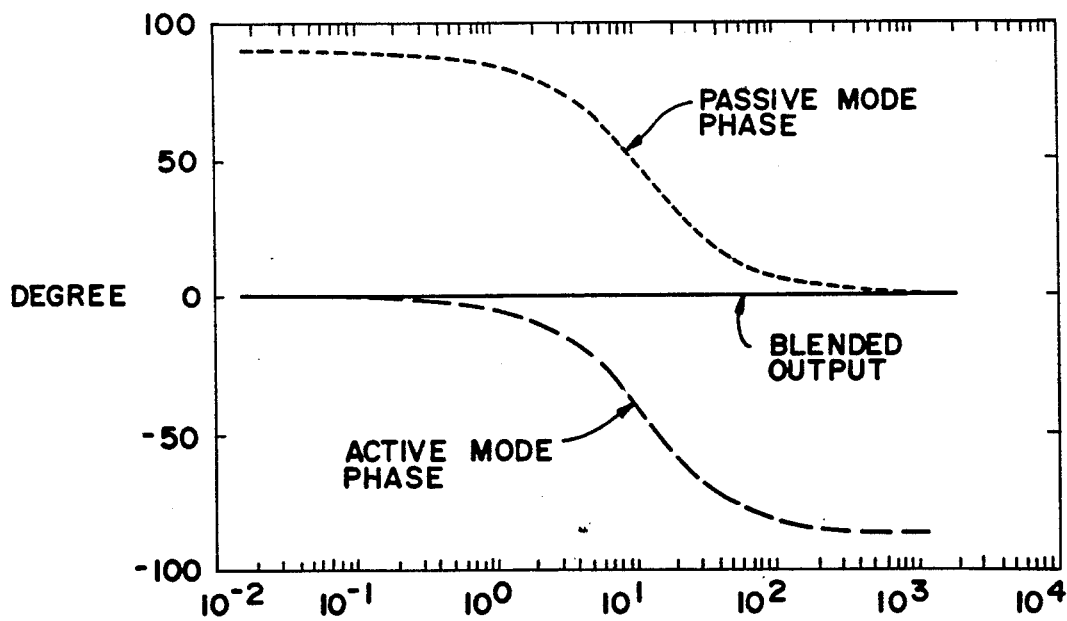
FIG. 9 illustrates the phase response for the sensor of the preferred embodiment over an extended useful bandwidth.

FIGS. 8 and 9 illustrate the theoretical response of the sensor volts/radian/second of angular velocity and phase delay for each sensor. The low frequency response represents the magnetohydrodynamic voltage potential E produced by the circumferential velocity of the mercury fluid mass which results from the Coriolis acceleration. This velocity component can be measured down to zero Hertz (constant angular rate).

The higher frequency velocity components above 1 Hz. which are directly induced to the mercury proof mass become detectable as the rotational frequency about the sense axis increases. FIG. 8 illustrates this phenomenon, and demonstrates that a blended response may be obtained providing a sensor having superior bandwidth.

FIG. 9 illustrates the delay phase response of both Coriolis induced and conventional proof mass mode between an input angular rate and the output signal phase from the sensor. Those phase differences, when blended to a single output signal, also results in a substantially constant phase response over an extended bandwidth.

To effect pumping of the fluid inertial proof mass from the lower channel 11 to the upper channel 17, three magnetohydrodynamic pumps are formed with individual magnets 24, 25 and 26, as well as electrodes 60, 61, 62, 63 and 66, 67. As is known with magnetohydrodynamic systems, the application of a DC potential in the presence of an orthogonal magnetic field will impart a force to a conductive fluid such as mercury.

Referring now to FIG. 3, there is an exploded view of a specific implementation of the foregoing principle of having two inertial proof mass sensors connected together by a plurality of MHD pumps to introduce the radial velocity component in each proof mass. The sensor of FIG. 3 is contained within a housing 30 of magnetic material which will confine the magnetic fields generated by the magnets 12 and 18. The first annular channel 17 is formed by an insulating cover 43 for the magnet 18 and a channel base 45. Stainless steel electrode 40 is shown having a central opening defining the outer circumference of the annular channel. The central opening in base 45 permits the annular channel to communicate with a conduit opening 27 of a common electrode 38.

The second annular channel 11 is similarly formed from a magnet 12 and an associated insulating cover 44. The annular electrode 41 limits the circumference of the annular channel 11. A base 46 forms the bottom of the second annular channel 11. An opening in the base 46 communicates with the conduit 27 so as to permit a return of the mercury inertial proof mass which was pumped from the lower channel 11 to the upper channel 17. The pumping mechanism for interconnecting each of the channels 11 and 17 is contained within a pump assembly 39. The pump assembly 39 includes three slits 21, 22 and 23, interconnecting the exterior of each of the channels 11 and 17. Two of the magnets 24 and 25 are shown inserted through the exterior of the pump assembly 39 to provide the requisite magnetic field for each of the fluid conduits 22 and 23.

For each of the shown conduits 21, 22 and 23 there are a pair of electrodes 50, 53, 54, 56 and 52, 55 terminating the lateral edges of the conduits. By applying the requisite potential between each of these pairs of electrodes 50 through 56, it is possible to pump the mercury inertial mass from the circumference of channel 11 to channel 17. The return conduit 27 formed in the common electrode 38 permits the mercury fluid mass to be returned to the lower channel 11.

Connections are made to the upper channel 17 electrode 40 and lower channel electrode 41, as well as the inner electrode 38 and pumping electrodes 50 through 56, through a plurality of threaded rods 60 through 68.

Referring to FIG. 4, there is shown a top view for the sensor of FIG. 3, along with section lines showing the sections of FIGS. 5, 6 and 7. By consulting FIGS. 5 and 6, it is clear that each of the threaded rods can be connected to a requisite electrode. The inner sense electrode 38, common to both channels 11 and 17, is connected by a rod 65 and threaded screw 59. The threaded screw 59 contacts the inner electrode 38, as well as the rod 65 to permit a common inner sense electrode to be formed for each of the channels 11 and 17. Similarly, FIG. 5 shows the bottom sense electrode 41 connected via rod 68 to permit sensing the potential between the inner electrode 38 and the outside circumference of the lower channel 11 defined by the opening in annular electrode 41. Each of the drive electrodes for the MHD pumps can be seen from FIG. 7, and are similarly connected to the exterior of the sensor by threaded rods represented by 60, 61, 63, 64 and 66, 67. Each of the threaded rods contacts a respective pumping electrode 50 through 56. The outer sense electrode for the upper channel 17 is provided via the electrode 62.

The compact sensor arrangement represented by these Figures has a sense axis coaxial with the axes for the sense channels 11 and 17. Connections may be readily made to the device for pumping the inertial mass material to form a radial flow within each of the channels 11 and 17.

Figure 10:
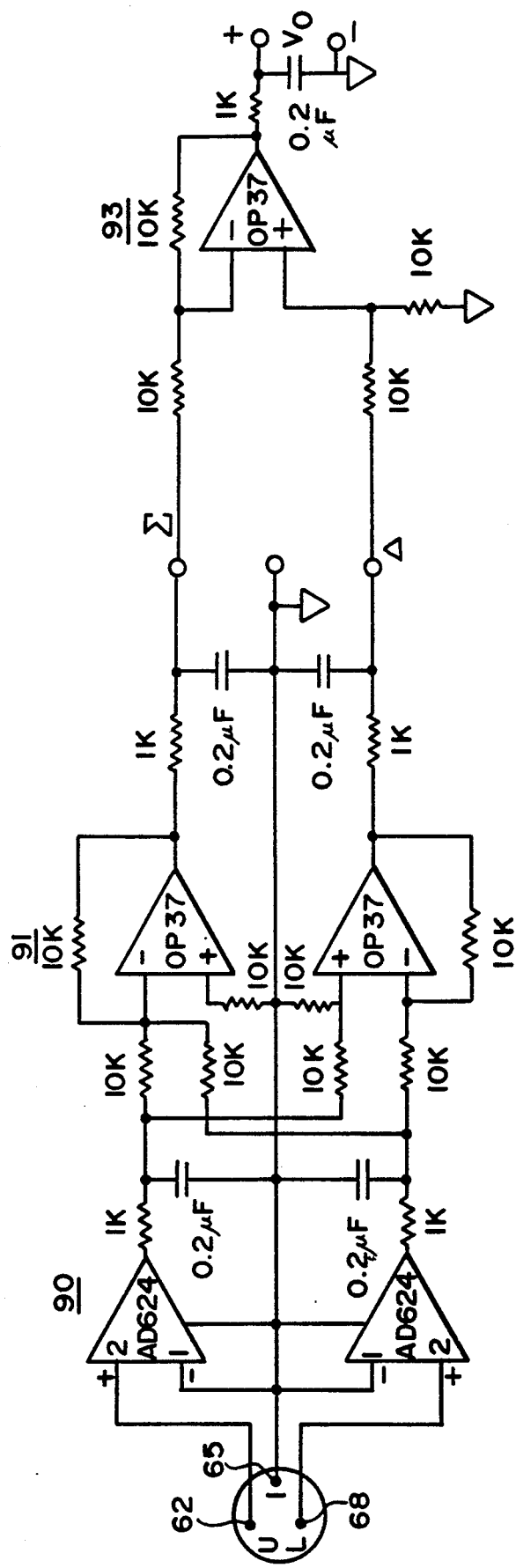
FIG. 10 illustrates electronic circuitry for combining the outputs from the upper and lower sense electrodes to obtain a blended output.

Using conventional sensor electronics as shown in FIG. 10, the output signals produced between the inner sense electrode 38 and outer sense electrodes 41 and 44 are combined as follows:

$$V_{out} = (V42 - V38) + (V41 - V38).$$

This formula produces an output voltage E(s) (where s denotes the Laplace operator) proportional to the following parameters:

$$\frac{E(s)}{\omega(s)} = \frac{2 B\ Wrs + 4 B\ WU}{s + \frac{\nu}{h^2}(1 + M^2)}$$

where B, r, B, U, W, M, $\nu$ and h are previously defined.

FIG. 10 illustrates one type of circuit for processing the signals generated from the sensor. As input signal connections, terminals 62, 65 and 68 representing the upper electode, lower electrode and inner electrode, respectively, are connected to a pair of differential amplifiers 90. The differential amplifiers 90 provide gain to the signals which are thereafter applied to a second pair of differential amplifiers 91. The second pair of differential amplifiers 91 provides a summation of these signals and a difference of these signals. A final stage 93 combines the output signals to provide the foregoing output voltage.

Figure 11:
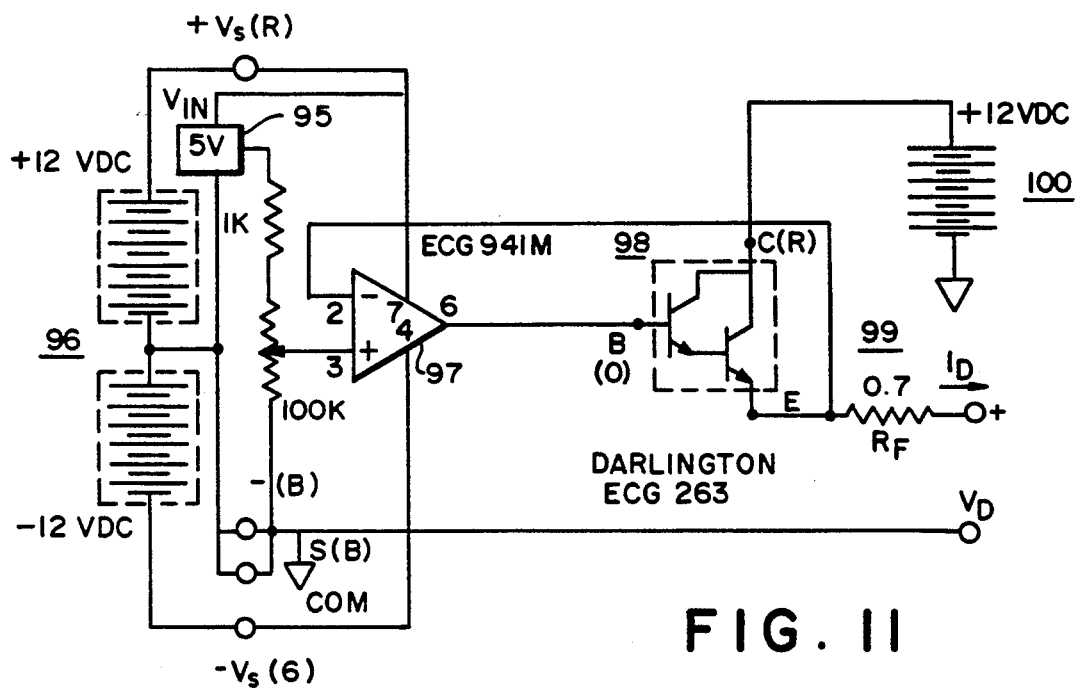
FIG. 11 illustrates a constant current power supply for driving the MHD pumps.
Figure 12:
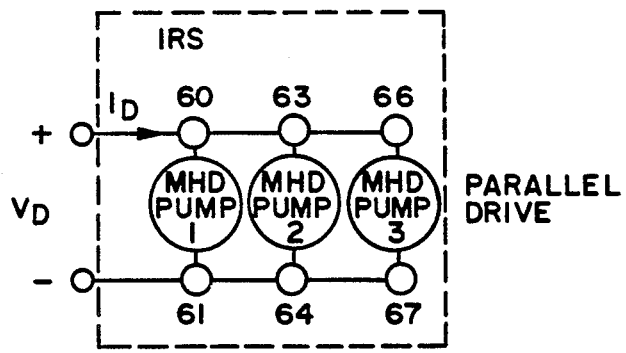
FIG. 12 illustrates how the various MHD pumps may be driven in parallel.
Figure 13:
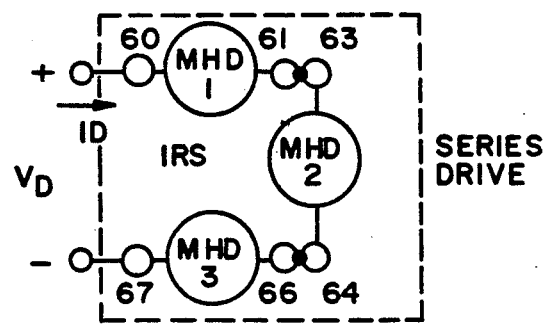
FIG. 13 illustrates how the various MHD pumps may be driven in series.

FIG. 11 illustrates a constant current power supply which will drive the MHD pumps, either connected in parallel as shown in FIG. 12, or connected in series as shown in FIG. 13. The power supply of FIG. 11 includes a voltage regulator 97 connected to a source of reference voltage via a regulator 95. The output of differential amplifier 97 is driven at a voltage supplied by the connected set of 12 volt batteries 96. The voltage produced from the operational amplifier 97 is used to drive a Darlington bipolar transistor pair 98. The Darlington transistor pair 98 will provide a constant current through the second DC voltage source 100 to provide a constant current drive to either a parallel connection of MHD pumps shown in FIG. 12, or a series connection of MHD pumps, as shown in FIG. 13.

It will be represented by skilled circuit designers that various embodiments of these electronic circuits may be suitable for effectively pumping the conductive fluid between annular channels of the sensors.

The advantages of the foregoing construction can be seen in FIGS. 8 and 9, illustrating the combined blended output from both upper and lower sense channels. The blended output shown includes a contribution to the circumferential velocity which results from the Coriolis acceleration of the radial flow of inertial mass material into each of the channels. Thus, below 10 Hz., the principal contribution to the output signal is from detection of the Coriolis acceleration induced circumferential velocity. Above 10 Hz., the upper and lower channels detect as a conventional inertial proof mass sensor where the contribution to circumferential velocity from Coriolis acceleration is decreasing rapidly.

It is possible to operate the device as a conventional inertial proof mass detector by not applying the required pumping potential to each of the MHD pumps. In this case, the conventional voltage versus angular velocity response for the sensor is obtained.

The exterior case 30 and its respective bulkhead 31 are held together by conventional fasteners 34, received in the threaded holes 35 of the case 30. A contained magnetic circuit is provided between each of the pumping magnets 24, 25 and 26 and the channel magnets 12 and 18. The center electrode 38 also functions as part of the magnetic circuit directing the flux path of the various permanent magnets. All the magnets are kept electrically insulated from the mercury.

Thus, it can be seen that by employing the detection of a Coriolis component of velocity introduced to each of the inertial proof masses, it is possible to measure angular rotation at frequencies lower than was previously obtained in the prior art represented by the foregoing U.S. patent. The device permits durable sensor assembly, with no moving parts other than the liquid mercury in each of the channels 11 and 17. This sensor will be applicable in those situations wherein angular rate gyroscopes have been historically used and where high reliability is desired. The problems associated with such angular rate gyroscopes, such as limited life due to mechanical wear and fatigue, as well as other catastrophic failures, is avoided with the simple no moving parts structure of the present sensor. Cost of production is also kept low due to the simple construction.

Thus, there has been described with respect to one embodiment a rate sensor defined more particularly by the following claims.

What is claimed is:

1. An angular rate sensor comprising:
    a housing having first and second spaced apart annular channels, having a common axis lying along an axis of measurement, each channel having an electrically conductive fluid proof mass, said housing rotating with respect to said proof mass about said axis;
    a first magnet located adjacent said first annular channel, and a second magnet adjacent said second annular channel;
    an inner sense electrode in contact with an inner surface of said first and second annular channels;
    first and second outer sense electrodes in contact with exterior portions of respective of said first and second annular channels; and,
    pumping means for pumping said fluid proof mass between said first and second annular channels, whereby a radial flow is introduced into said annular channels, which results in an electrical signal being induced between said inner sense electrode and said first and second outer sense electrodes as a result of Coriolis acceleration induced circumferential velocity components to said proof mass.

2. The angular rate sensor of claim 1 wherein said pumping means comprises:
    a plurality of conduits connecting said annular channels;
    a plurality of magnets, each magnet associated with one of said conduits;
    a pair of electrodes associated with each of said conduits, connected to a voltage source forming with said magnets an MHD pump forcing said fluid from said second annular channel to said first annular channel; and,
    a return conduit connected between said first annular channel and second annular channel, whereby fluid pumped from said second channel to said first channel is returned to said second channel.

3. The angular rate sensor of claim 1 wherein said housing is made from a magnetic material.

4. The angular rate sensor of claim 1 wherein said fluid is mercury.

5. The angular rate sensor of claim 1 further comprising means for combining a signal from said first outer sense electrode with a signal from said second outer sense electrode; wherein a combined signal result is defined by:

$$\frac{E(s)}{\omega(s)} = \frac{2BWrs + 4BWU}{s + \frac{\nu}{h^2}(1+M^2)}$$

where
B = the applied magnetic field flux;
W = the channel width;
U = the average radial mercury velocity;
M = the Hartmann number;
h = the channel height;
$\nu$ = mercury kinematic viscosity;
s = Laplace operator;
$\omega$ = angular rate;
E = output voltage; and
r = rms channel radius.

6. A wideband angular rate $\omega$ measuring device comprising:
    a housing supporting first and second annular channels having a common axis, each of said channels including an electrically conductive liquid which functions as an inertial proof mass;
    first and second magnets opposite a respective of said first and second annular channels;
    first and second electrode means associated with respective of said first and second annular channels, said electrode means providing a signal in response to relative motion between said inertial proof mass in each of said channels and said housing;

a pumping means connecting each of said annular channels, providing a flow of said liquid in an orthogonal direction to the plane of said first and second channels, providing radial flow into said channels; and, a summing circuit for combining signals produced from said electrode means, whereby a signal is produced proportional to the circumferential velocity of said housing with respect to said liquid.

7. The angular rate measuring device of claim 6 wherein said pumping means comprises:
a plurality of connecting channels connected between said annular channels;
a plurality of magnets, each of which is associated with each connecting channel;
a pair of electrodes associated with each connecting channel; and,
a return conduit connected between said first and second annular channels, whereby fluid is pumped between said first and second channels through said connecting channels, and back to said first channel through said return conduit in response to a voltage potential applied to said pairs of electrodes.

8. The wideband angular rate measuring device of claim 7 wherein said first and second magnets associated with said first and second annular channels form a magnetic circuit with said magnets associated with said connecting channels.

9. The wideband angular rate sensor of claim 6 wherein said first and second electrode means comprise:
a common electrode contacting an inner circumferential surface of said first annular channel and an inner circumferential surface of said second annular channel;
a first electrode contacting an outer circumferential surface of said first annular channel; and,
a second electrode contacting an outer circumferential surface of said second annular channel.

* * * * *